United States Patent [19]
Brown et al.

[11] Patent Number: 5,832,876
[45] Date of Patent: Nov. 10, 1998

[54] PET ANIMAL LIVING STRUCTURES

[76] Inventors: Michael Brown, 1703 Jardin Des Sapins, Orleans, Ontario, Canada, K1C 8E3; Kevin J. Bailey, 2370 Tobin Avenue, Ottawa, Ontario, Canada, K2C 1K2; Steven L. Kayser, 26 McClure Crescent, Kanata, Ontario, Canada, K2L 2H3; Ian D. Kayser, 39 Kimbolton Crescent, Kanata, Ontario, Canada, K2K 2S3

[21] Appl. No.: 832,668

[22] Filed: Apr. 4, 1997

[51] Int. Cl.[6] .................................................. A01K 15/02
[52] U.S. Cl. ........................ 119/706; 119/422; 119/452; 119/256
[58] Field of Search .................................. 119/706, 417, 119/421, 422, 452, 702, 256, 246, 266, 267

[56] References Cited

U.S. PATENT DOCUMENTS

| | | | |
|---|---|---|---|
| 1,803,571 | 5/1931 | Ulman | 119/267 X |
| 3,326,185 | 6/1967 | Perez | 119/267 X |
| 4,044,721 | 8/1977 | Foley et al. | 119/256 |
| 4,133,024 | 1/1979 | Roehrick | 119/245 X |
| 4,953,502 | 9/1990 | Hoover | 119/452 |
| 5,010,845 | 4/1991 | Azpurua et al. | 119/452 |
| 5,078,094 | 1/1992 | Hoover | 119/702 X |
| 5,095,852 | 3/1992 | Hoover | 119/452 |

Primary Examiner—Michael J. Carone
Assistant Examiner—Yvonne R. Abbott
Attorney, Agent, or Firm—R. J. Austin

[57] ABSTRACT

The invention is concerned with a pet animal structure for insertion into a transparent tank. The structure is in a single piece with upper and lower body parts. The lower body part has floors for movement of the animal and the upper body part has a shoulder which overhangs the lower body part. The upper body part when the structure is inserted an appropriate size tank, closes and extends into the top opening to the tank with the shoulder below the top opening so as to protect top regions of walls of the tank. Preferably, the upper body part has a downward facing support surface for supporting the structure upon a top edge of the tank so that the bottom of the structure is spaced from the bottom of the tank. Also advantageously, the floors are positioned to prevent the animal from gnawing at the shoulder while providing freedom for the animal to move between the structure and the tank when standing upon the bottom of the tank.

5 Claims, 9 Drawing Sheets

PET ANIMAL LIVING STRUCTURES

This invention relates to living structures for pet animals of small size and having gnawing characteristics such as hamsters, gerbils and mice.

Pet animal living structures for use inside domestic buildings have been generally known for many years. These structures have differed in design not only with the aim of satisfying the particular type of environment in which it is believed a specific type of animal is most comfortable in a state of captivity, but also at the specific whim of the designer. Thus, many types of design are known. These types include cages for domesticated birds and also table or floor mounted structures of a single or multiple storey construction for other animals, e.g. hamsters, gerbils or mice.

In addition, in U.S. Pat. No. 4,677,938 there is described a "gymnastic device" for small animals in which a vertical partition is inserted into a transparent breeding box and horizontal plates are carried upon the, or each, partition to form walkways for the animals. One of the objects of this patent is to enable the owner of the animals to enjoy seeing them moving around the box. In a further U.S. Pat. No. 4,850,306, an animal cage is described which comprises an enclosed rectangular structure positioned above the open top of an animal tank. A suspended floor is located within the tank intermediate the rectangular structure and the bottom of the tank. Ropes extend between the suspended floor and the rectangular structure on the bottom of the tank. In addition, U.K. Patent Application no. 2,148,087 describes a pet animal enclosure which is a flat vertically disposed box with a removable front. Ropes are provided for the animal to move upwards and downwards within the box which may be wall mounted.

In a further U.S. Pat. No. 4,651,675, a multiple compartment structure is provided which allows for two-dimensional movement in a vertical plane with openings to allow for such movement and in U.S. Pat. No. 5,054,427 there is a described a compartment structure of multiple parts which allows for three-dimensional movement.

Containment of some of the above structures within tanks is shown in the prior documentation and a lid or cover is provided across each tank to hold the animal captive.

However, it has been found with structures such as those described above, that when used for containment of gnawing pet animals such as hamsters, gerbils or mice, gnawing action leading to rapid destruction of the structures is likely to occur. Such destruction may occur to the lid or to walls of the structures leading to a very unattractive appearance and which may eventually lead to release of an animal. In particular, where a top edge of a tank is protected, which is normal, by a protective elongate molded edge strip, an animal is likely to reach up and destroy lower regions of this. Even where an animal cannot normally reach such a strip by standing, it is not unknown for an animal to leap the full depth of a tank and grip on to the edge strip by his front paws and teeth to enable gnawing to proceed. Such an edge strip conventionally has a horizontal flange facing inwardly into the tank for holding a tank lid. This flange particularly is subject to destructive tendencies by a contained animal if it is accessible to him. Apart from this, if a lid or cover of the tank is held by such a flange, then continued and progressive destruction of the flange may eventually result in the lid or cover collapsing into the tank with dire consequences.

The invention seeks to provide a pet animal structure which, in use, will overcome the above problems.

The present invention provides, according to one aspect, a pet animal structure for insertion into a transparent tank, the structure being in a single piece and comprising an upper body shoulder part and a lower body part, the lower body part provided with floors for movement of the animal, and the upper body shoulder part extending over the floors of the lower body part and providing a shoulder which overhangs the lower body part for positioning the upper body shoulder part into and below a top opening of the tank, upon insertion of the structure into the tank, so as to close the opening and provide a barrier to top regions of walls of the tank.

With a shoulder provided according to the above defined invention, the shoulder will extend downwardly within a tank so as to shield the top region of the tank and thus will shield from the animal a protective elongate molded edge strip if one is provided around a top edge of the tank.

When the pet animal structure according to the invention is installed in the tank, the structure prevents an entrapped pet animal from escaping by movement of a lid from the tank. The reason for this is that the upper body shoulder part provides the lid and is formed in a single piece with the lower body part. The animal cannot therefore raise the upper body shoulder part because the animal must be standing upon the lower body part when exerting pressure upon the upper body shoulder part.

It has also been found in practice, in one preferred arrangement, that where the construction allows for free movement of the animal between the wall of the tank and the structure, then the animal is extremely unlikely to become interested in gnawing the material of the structure. Gnawing of the pet animal structure is thereby minimized or, as has been found in most cases relating to the invention, to be completely avoided. This aspect of the invention therefore avoids a situation which has been found to normally occur in other structures in which small gaps, too small for passage of the animal, have been defined between parts of structures and between parts of the structures and walls of the tank. In such prior situations, it appears that a gnawing animal instinctively feels that where such small gaps exist, then he needs only to enlarge a gap for him to escape from the structure completely. The animal hence commences to gnaw with the intention of enlarging the gap without realizing, of course, that he is merely increasing his degree of freedom of movement within the tank itself. Nevertheless undesirable gradual destruction of prior pet animal structures results.

With the invention, it is also preferable that the upper body shoulder part has a substantially horizontally extending and downward facing support surface. This support surface is conveniently provided at the top end of a vertical surface extending from the shoulder. This support surface is provided for supporting the structure upon the tops and walls of tanks with the lower body part suspended within the tank. With this arrangement, the structure may be inserted into a tank of suitable size with the lower body part spaced a sufficient distance from the bottom of the tank to allow for free passage of the animal below the body part. Hence, the animal is extremely unlikely to gnaw at the bottom regions of the lower body part in an attempt to escape between the lower body part and the bottom of the tank. With this preferred arrangement, therefore, having a support surface, the animal is free to move both beneath the lower body part and around the structure lying below the shoulder.

In another preferred arrangement, all of the floors of the lower body part are disposed in locations to prevent the animal from being able to gnaw the shoulder.

With the latter arrangement, the lower body part may have floors of different heights while still not enabling the animal to gnaw the shoulder. The animal is prevented from gnawing not only by the vertical distance from the shoulder but also, in the case of an upper level floor, by the horizontal distance which may render it impossible for an animal to gnaw the shoulder. In some cases, he may even fall from that particular floor.

According to a further aspect of the invention a pet animal structure is provided which comprises a wall means defining a cavity, the wall providing a plurality of floors for movement of the animal, and an electric light bulb holder carried by the wall to hold an electric light bulb within the cavity, the wall permitting light to pass through the wall from the cavity.

Embodiments of the invention, will now be described, by way of example, with reference to the accompanying drawings, in which.

Figure 1:
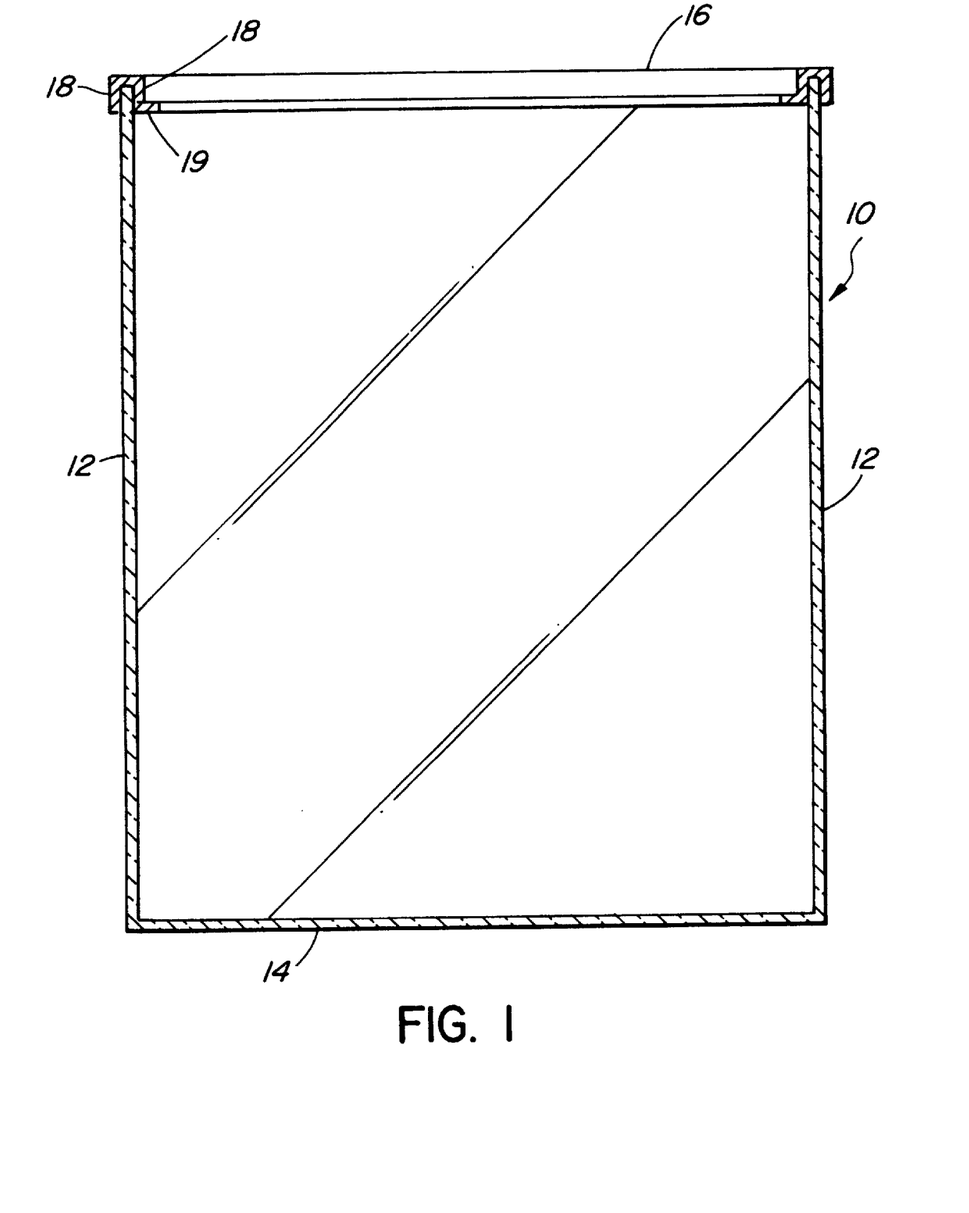
FIG. 1 is a side elevational view in cross-section of a conventional rectangular glass tank or aquarium.

As shown by FIG. 1, a conventional rectangular glass tank, or aquarium 10, has four glass walls 12 and a base 14. At the top of the walls of the tank is provided a protective elongate molded edge strip 16 which forms the multiple purpose of protecting the top edges of the walls against breakage, serving to hold a top cover (not shown) or hood over the tank in normal usage, and also protecting the owner from being cut by the top edge of the tank. For these particular purposes, the edge strip 16 is formed as an inverted U shape as shown by FIG. 1 so that it has two arms 18 extending slightly down the inside and the outside surface of each wall 12. The inside wall 18 terminates at its lower end in a horizontal flange 19 for supporting the hood or cover normally used with the tank. Such tanks 10 are sometimes used for holding small pet animals such as animals, gerbils or mice, instead of for their conventional use, i.e. as a fish aquarium. It is found that in particular where floor levels for movement of pet animals are positioned above the bottom of the tank, that the edge strip 16 is bound to suffer the aggressive gnawing action of such animals. It is also known for animals to leap from the bottom of the tank to hold on to the flange 19 while gnawing takes place. In addition to this, of course, if a retaining cover is placed over the edge strip 16, any gnawing of the strip may eventually lead to gnawing of the cover itself and the possible eventual release of the animal.

The present invention as highlighted by the embodiment now to be described overcomes such problems.

As shown in FIGS. 2–6 a pet animal structure for use with gnawing animals such as hamsters, gerbils or mice, comprises a plastic molded structure 20, generally of indeterminate or random shape as shown to add interest to the pet owner in use. The structure 20 is a single one piece structure having a first or lower body part 22 and a second or upper body shoulder part 24. The lower body part 22 is formed with through openings 26 which extend between two sides of the structure, one side being shown in FIG. 2 and the other side in FIG. 3. In addition to this the lower part has floor regions 28 on both sides and at both ends 30. These floor areas 28 are different heights, different configurations and also of different sizes provided by the molding operation. Other floor areas 29 are provided by steps 32 which project outwardly from both sides of the structure shown by FIGS. 2 and 3. Hence the floors areas provided by the steps 32 are disposed further outwardly from the structure than the floors 28 on that side of the structure.

Figure 2:
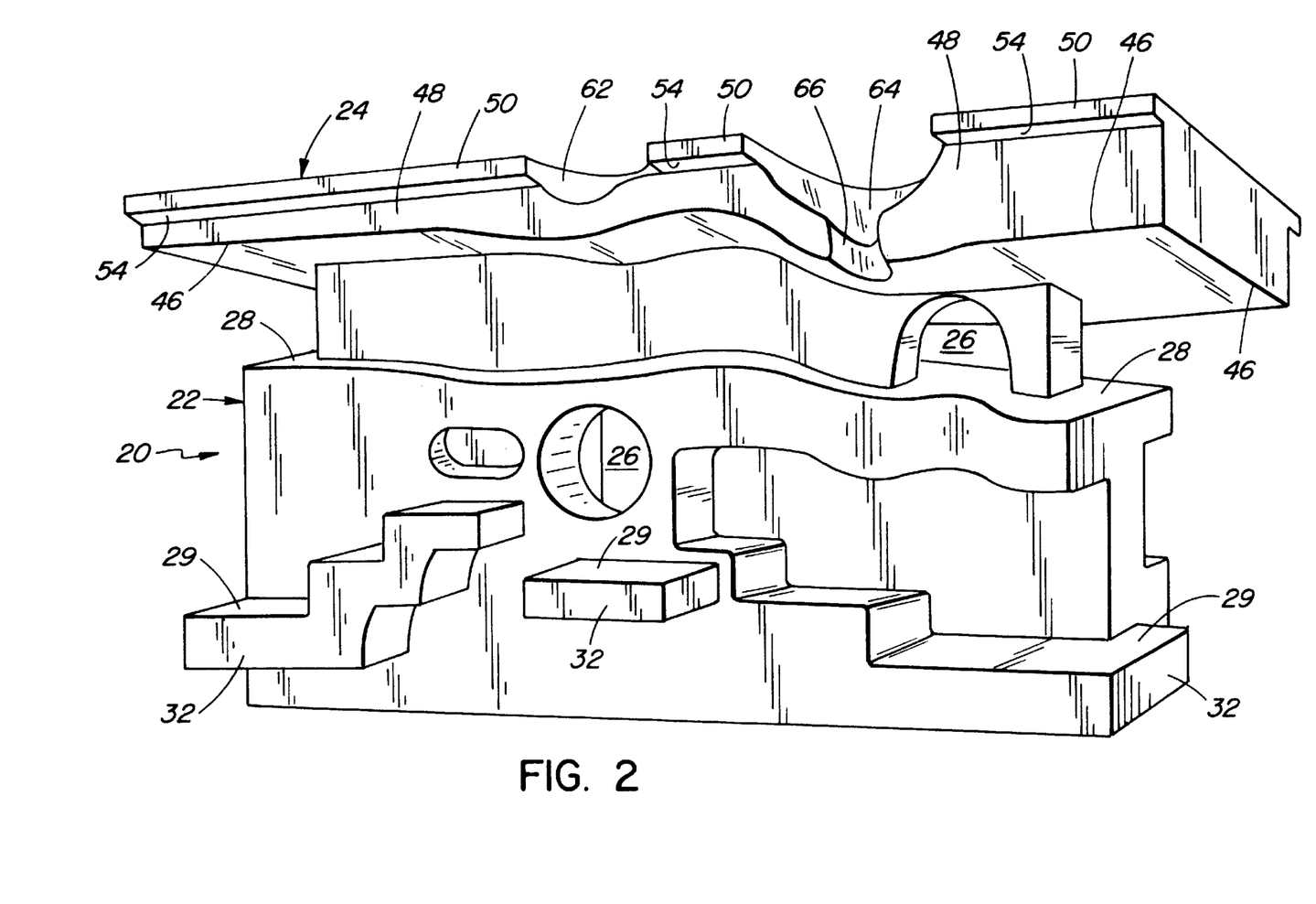
FIG. 2 is an isometric side elevational view of a pet animal structure according to a first embodiment.
Figure 3:
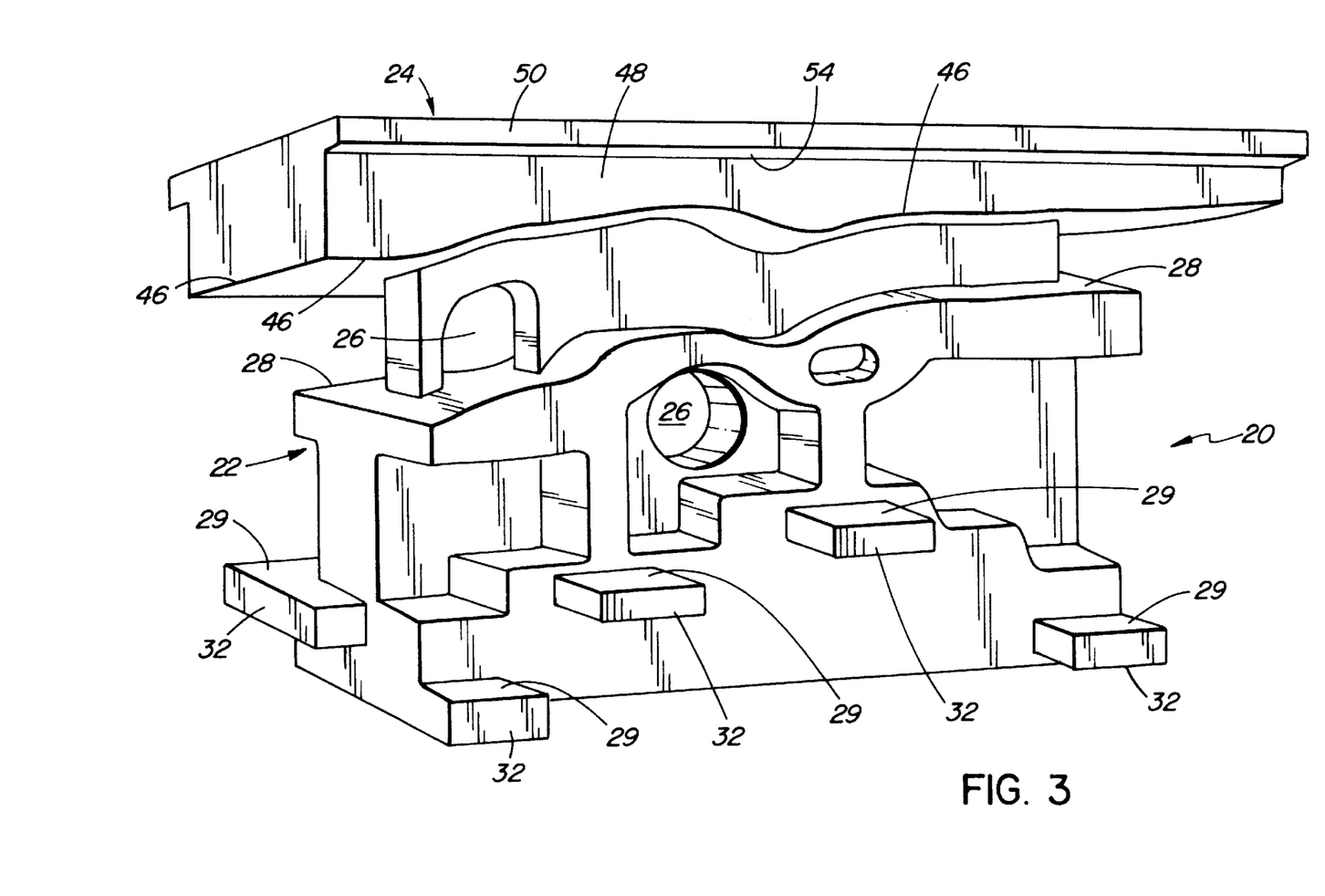
FIG. 3 is an isometric view of the animal structure taken from the other side.
Figure 4:
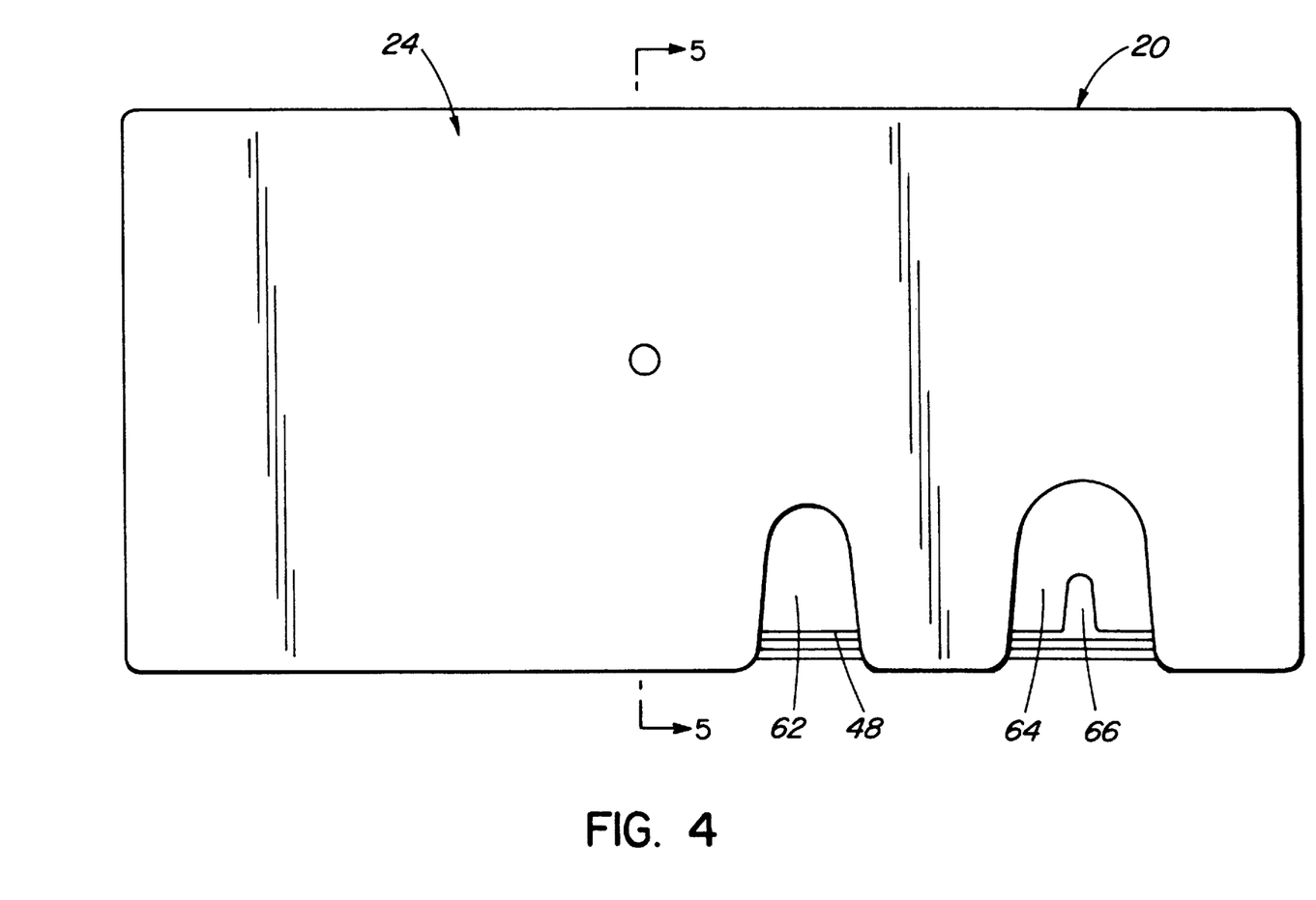
FIG. 4 is a top view of the animal structure taken in the direction of arrow 4 in FIG. 2.

The upper body part 24 has a generally flat upper surface and extends across and overhangs the floors of the lower body part to provide a shoulder 46 overhanging each side of the structure substantially from end to end as shown in FIGS. 2, 3 and 4. A shoulder 46 also extends outwardly from the ends 30 of the structure. A vertical surface 48 extends upwards from each shoulder. Each of the shoulders 46 however, while lying substantially in a vertical plane, is not rectilinear but follows a random curved shape from end to end in side elevation (FIGS. 2 and 3). This curved shape is provided partly for aesthetic reasons and also for functional reasons as will be seen below.

On each side of the structure and at spaced positions, the vertical surface 48 provided by each shoulder terminates in an outward projection 50 which defines beneath it a downwardly facing support surface 54. The projection 50 on one side (FIG. 2) and its surface 54 extend in broken form along the structure. The support surfaces 54 are designed to sit upon a horizontal surface for reasons to be described below, and generally themselves follow along a horizontal plane.

Figure 6:
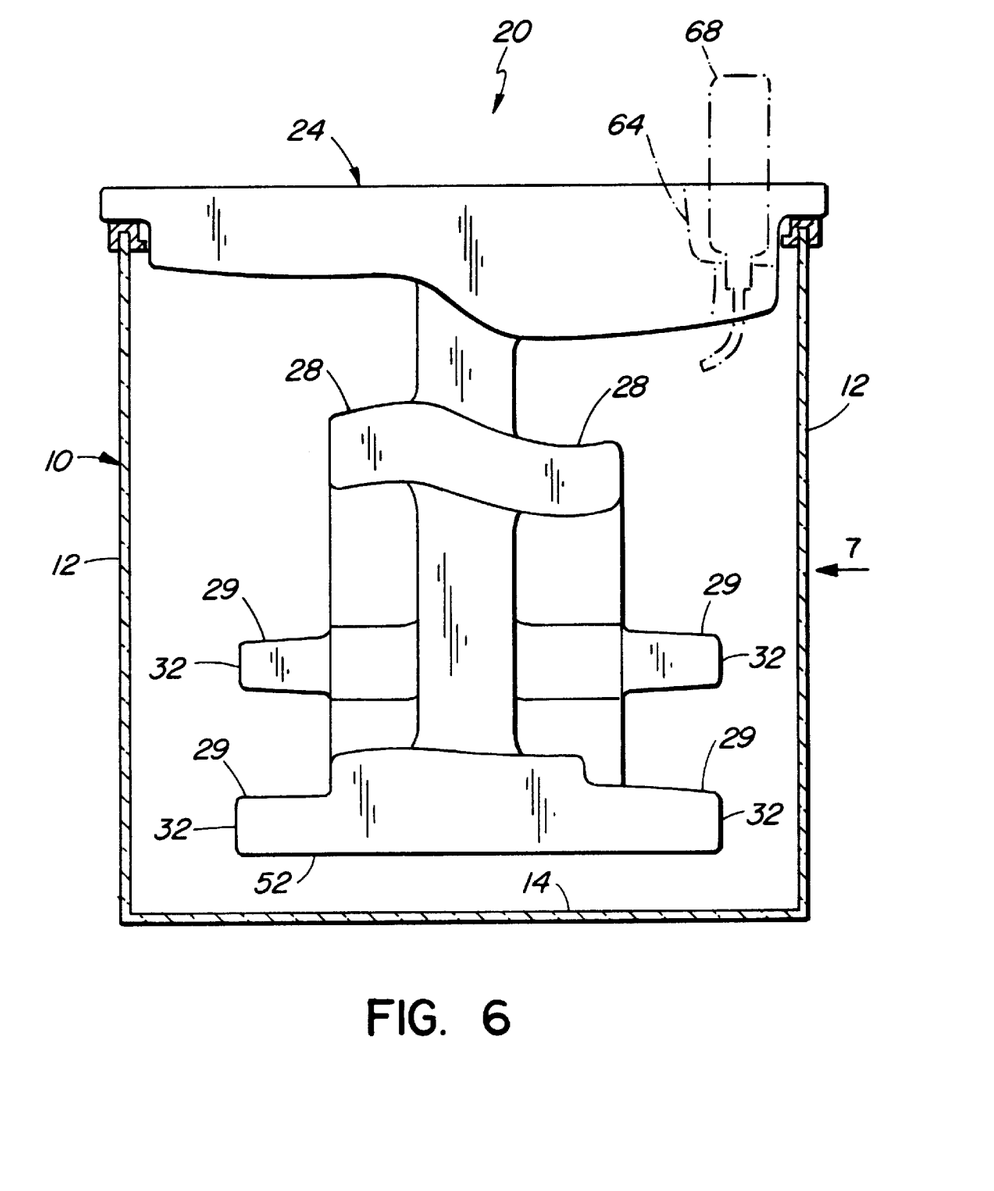
FIG. 6 is an end elevational view of the animal structure mounted within the rectangular tank of FIG. 1.
Figure 7:
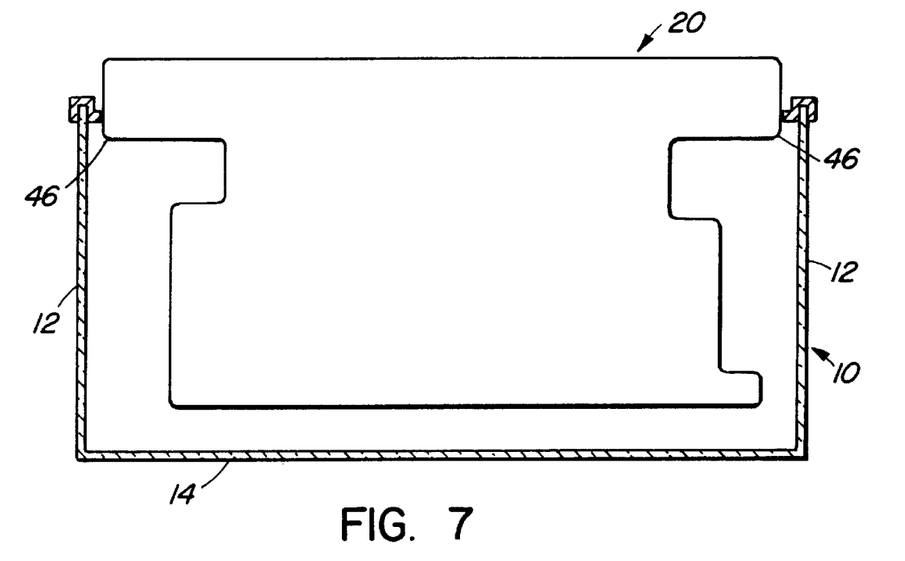
FIG. 7 is a side elevational view with the tank in cross-section taken in the direction of arrow 7 in FIG. 6.
Figure 8:
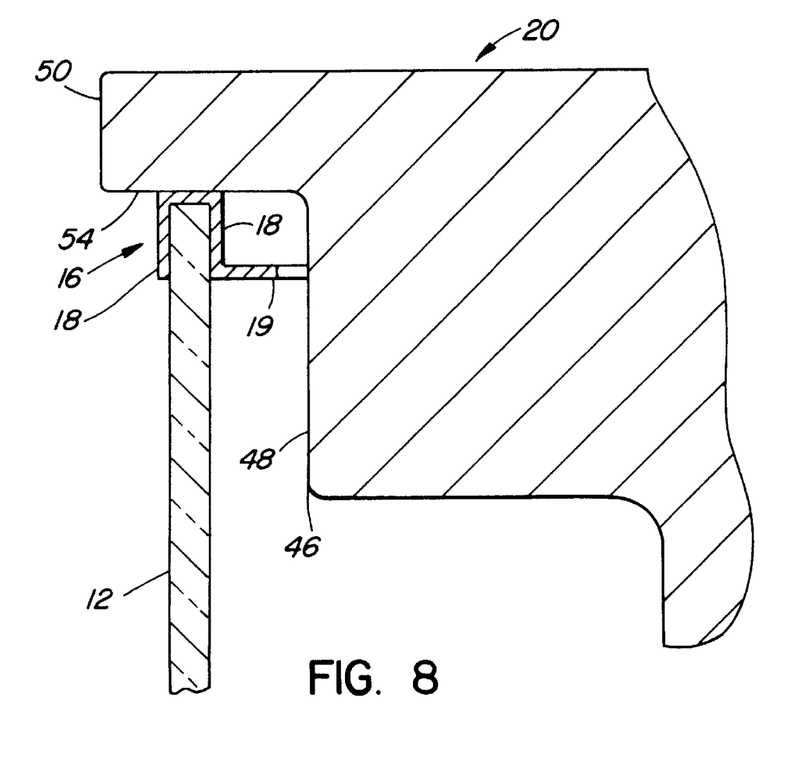
FIG. 8 is a cross-sectional view of part of the animal structure and tank assembly to a larger scale.

The structure 20 is to be mounted inside a conventional transparent tank 10 of a desired size as shown by FIGS. 6 and 7. The support surfaces 54 are carried upon the top of the tank (FIG. 8) from which they are protected by the commonly used edge strip 16. With the appropriately sized tank, the structure is thereby supported along its two long sides at spaced intervals by the surfaces 54. When the structure is assembled to the appropriate tank 10 then the shoulders 46 are located at least slightly below the levels of the flange 19 and the edge strip 16 as shown particularly by FIG. 8. Hence, the vertical surfaces 48 extend upwardly while facing the inside surface of the tank walls 12 to lie closely adjacent to the free edge of the flange 19.

As may be seen from the above description therefore, the overhanging shoulder 46 along the sides of the structure 20 prevent a gnawing animal from reaching the edge strip 16 on top of the tank. At both ends 30 the shoulder 46 provides the same function.

With the arrangement, although the edge strip 16 is protected, it is also necessary with this construction to prevent the gnawing animal from gnawing the shoulder 46 itself. This precaution is taken in the embodiment and according to the invention by ensuring that all of the floor areas 28 and steps 32 of the structure are positioned such that the animal when located on any of these areas cannot gnaw the shoulders and support himself at the same time. As an example of this, FIG. 6 is referred to. As may be seen from FIG. 6, the lower floor areas, i.e. floor areas 29 of the steps 32 are disposed at a lower part of the structure than certain of the floor areas 28 because the steps 32 project further outwardly from the structure. Thus, it is found that a gnawing pet animal standing on the floor areas 29 may be able to reach upwards and support himself upon the inside surface of the tank walls while reaching for the shoulders 46. However, if this distance is sufficiently great then the animal cannot reach the shoulders and cannot gnaw at the shoulders to commence destroying the structure. In the embodiment, the vertical distance which is normally considered to be required for this between the shoulder and the highest of the floor areas 29 is in the region of typically 150 to 180 millimeters where the floor is positioned inwardly from the shoulder by a distance typically of from 30 to 50 millimeters. On the other hand, the upper floor areas 28 are required to be further in than the floor areas 29 to ensure that gnawing does not occur. In this case the floor areas 28 in the embodiment are typically at least 50 millimeters inwardly from the shoulders 46 and have a minimum vertical distance from the shoulders typically of between 70 and 90 millimeters. It has been found that with the upper floor areas 28 should the animal endeavour to reach upwardly to gnaw at the shoulders 46, then he will always fall from the floor area to the bottom of the tank so that no damage to the structure can occur. It follows therefore that all of the floor areas of the structure are positioned such that a gnawing animal cannot gnaw a shoulder 46. In some cases, an upper floor may be extremely close to a shoulder 46, but while the animal has freedom to move on to the floor, it is not possible for him to turn over to enable him to gnaw the shoulder.

In addition to this, because the structure is in one piece, then it is capable of supporting itself within the tank 10, i.e. by the support surfaces 54 upon the top edge of the walls 12. Hence, no separate top or cover is required to prevent escape of the animal. Of course, the animal cannot force the top of the structure away from the tank to allow for its escape even though the top is not secured in position. It is merely held down by the weight of the structure. Apart from the weight of the structure inhibiting its movement by the force of the animal, it is also impossible for the animal to move the upper part of the structure away to enable his escape, because the upper part is carried on the lower part upon which the animal must stand when exerting an upward pressure upon the lid or upper part. It follows therefore that gnawing of the upper parts of the structure are curtailed and raising of the upper part is also impossible so that escape of an animal from within a tank holding the structure 20 is virtually impossible. In conjunction with the desirable positioning of the floor areas as discussed above to prevent gnawing of the shoulders 46, then the floor areas and all surfaces of the lower part 22 of the structure around which the animal may move are disposed sufficient distances away from the tank walls 12 to enable freedom for movement of the animal around the structure. This free movement occurs without any requirement of the animal to force his way through any narrow gaps between the structure and the side walls 12. It has been found that gnawing action mainly takes place when the animal finds a restrictive gap and instinctively feels that if he can enlarge the gap he may be able to escape. However with this arrangement and located in an appropriately sized tank no such small gaps occur.

In addition, in an appropriately sized tank as shown by FIGS. 6 and 7, then the structure is wholly supported by the surfaces 54 upon the tank walls. There is no possibility that any part of a bottom 52 of the structure may touch the bottom 14 of the tank. In an ideal situation the gap between the bottom 52 and the bottom 14 of the tank is sufficiently great for a gnawing animal to have complete freedom to move beneath the bottom 52 so that he does not tend to gnaw at the bottom to enlarge his freedom of movement.

Also to assist in detracting from encouraging the animal to gnaw at the structure, all floors and walls of the structure are made of a minimum depth or thickness, which it is believed should be at least in the region of 1.00 to 1.5 cms. Hence all the wall formations of the structure in the lower body part 22 and the thickness of the steps 32 should be of at least 1.00 cms. both horizontally and vertically.

Further refinements in this embodiment relate to the method of feeding and to an aesthetic appeal addition made to the structure. So far as feeding is concerned, the upper surface of the structure is indented with a slight downward inclination 62 to guide solid food over the vertical wall 48. The food when dropping over the wall may descend to the bottom of the tank 10. At the location of the inclination 62, the projection 50 and surface 54 are omitted, as shown particularly in FIGS. 2 and 4, to provide sufficient width at this position to insert fingers down the surface 48 and around the shoulder 46 for the purpose of raising the structure out of the tank. For this purpose the use of one hand may be necessary as the other hand may be required to catch the animal if he is being supported upon the structure as it is being removed. In addition, at the one end of the upper surface, a trough 64 is provided terminating at its lower end in a through hole 66. The trough and the through hole are for accommodating a water tube 68 shown in chaindotted outline in FIG. 6, with the lower end of the tube facing towards a floor area 28. At this position the floor area 28 is located so that the animal may reach the lower end of the feed tube but cannot reach the shoulder 46 which at that position extends lower than at any other location.

Figure 5:
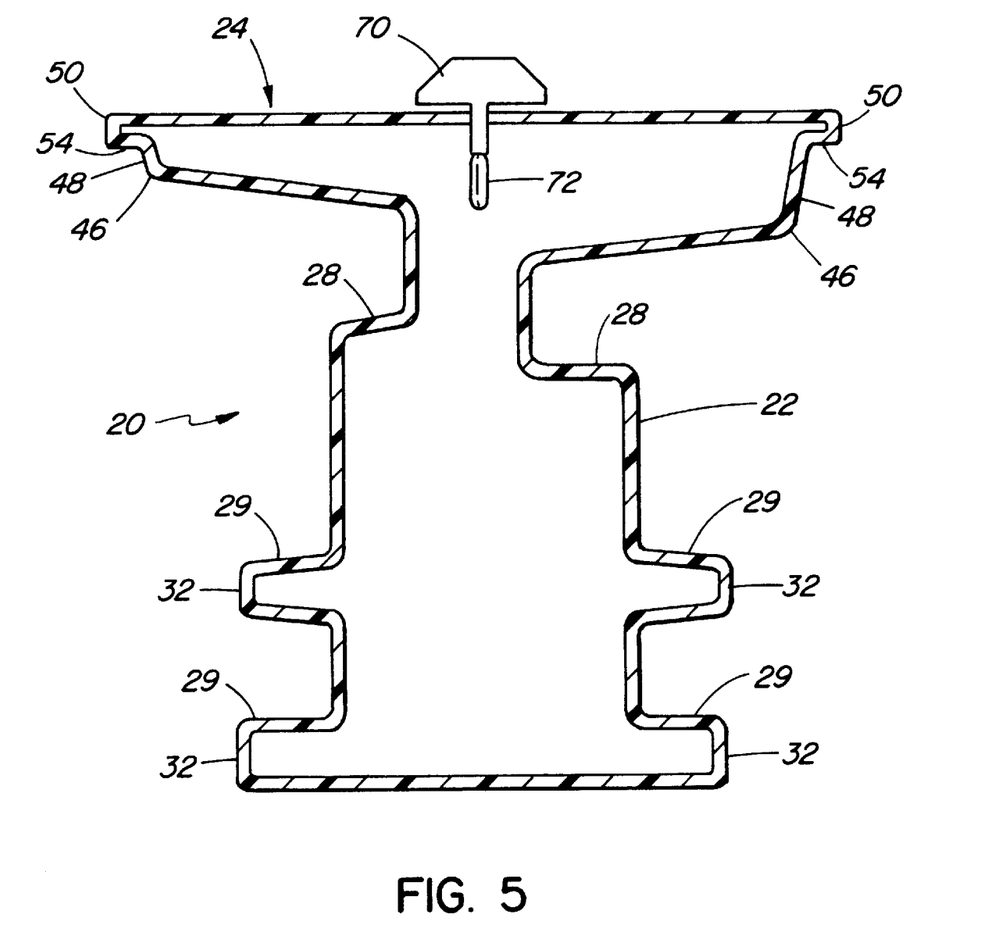
FIG. 5 is a cross-sectional view of the animal structure taken along line 5—5 in FIG. 4.

For aesthetic reasons, the structure 20 is provided with means for illuminating it when a room is in a darkened or semi-lit condition. For this particular purpose, the structure 20 is made hollow by a suitable molding operation as shown by FIG. 5 with a wall thickness of approximately 3.00 millimeters. Into the top surface 24 of the structure is inserted an electric light bulb holder 70 for carrying an electric light bulb 72. With the structure formed of a semi-transparent or translucent material, it may be seen that with the light bulb switched on then the inside of the structure 20 is illuminated. Because of its various random shapes and configurations and angular positioning of various surface parts relative to the light bulb, the light shining outwardly from the structure may be seen to be oddly attractive in having excessively light regions and, by contrast, dark regions, which emphasise the geometry of the structure in a partially lit or unlit room. Also with the structure illuminated, the activity of the enclosed pet animal may be seen under different conditions of interest.

Figure 9:
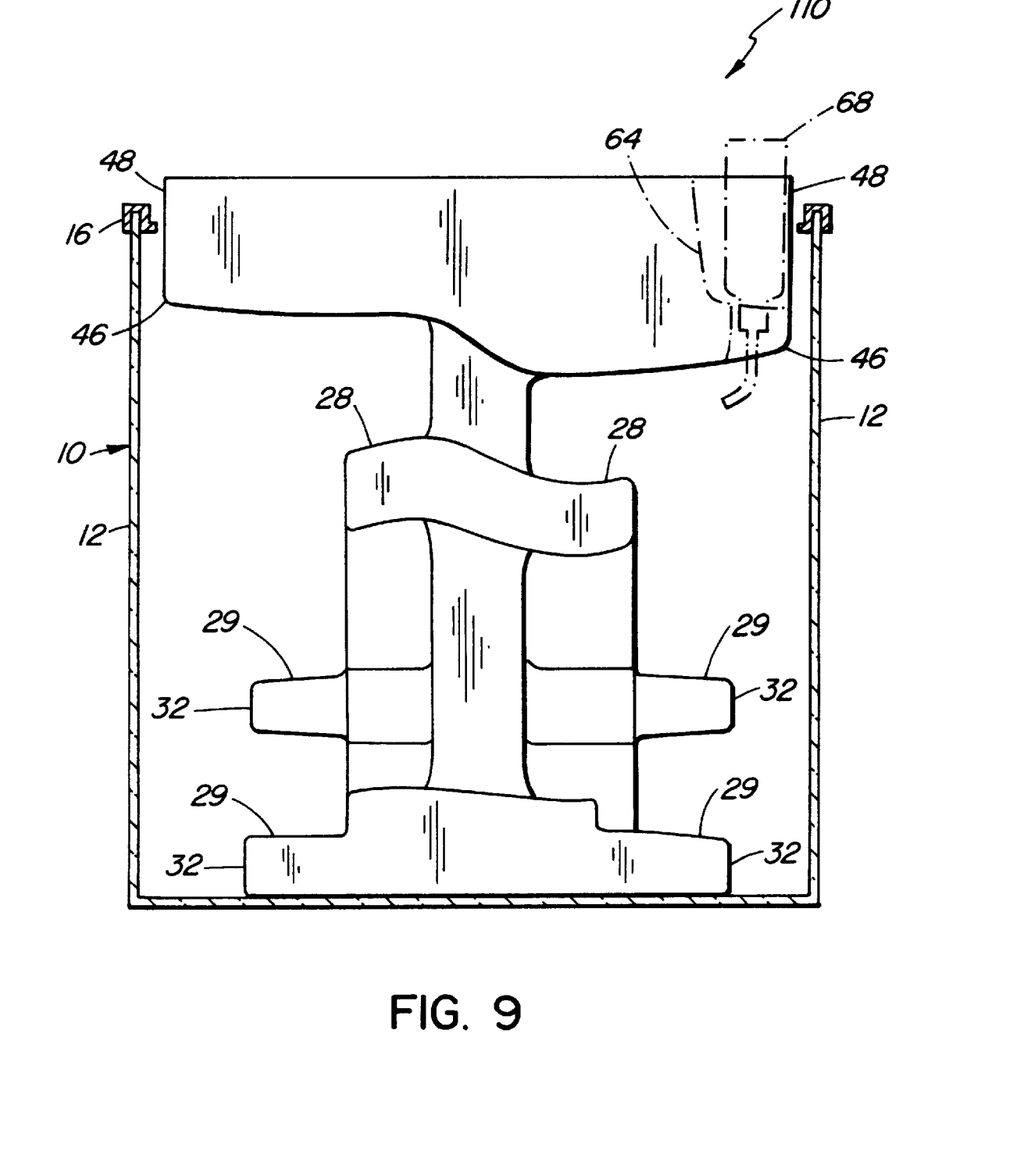
FIG. 9 is a view similar to FIG. 6 of a second embodiment.

In a second embodiment (FIG. 9), the pet animal structure 110 is basically similar to that of the first embodiment and like parts bear the same reference numerals. The second embodiment differs, however, in that the surface 48 extends to the top of the structure thereby eliminating the shoulder 50 and support surface 54. With this structure, when inserted into a tank 10 of appropriate size, the shoulder 46 shields the top region of the tank and edge strip 16 from a gnawing animal. However, as the upper edge of the tank walls do not support the structure, the structure is carried upon the bottom 14 of the tank. Of course, this results in no freedom to move for the animal beneath the structure, thereby providing unfortunately, the possibility for gnawing by the animal at the bottom edges of the structure.

In a third embodiment (FIG. 10), a substantially cylindrical pet animal structure 71 has an upper body part 73 with a substantially flat top surface 74 and a lower body part 76. The upper part 73 has a shoulder 78 similarly positioned to the shoulder 46 in the first embodiment, and an upper shoulder 80 having a downward facing support surface 82.

Figure 10:
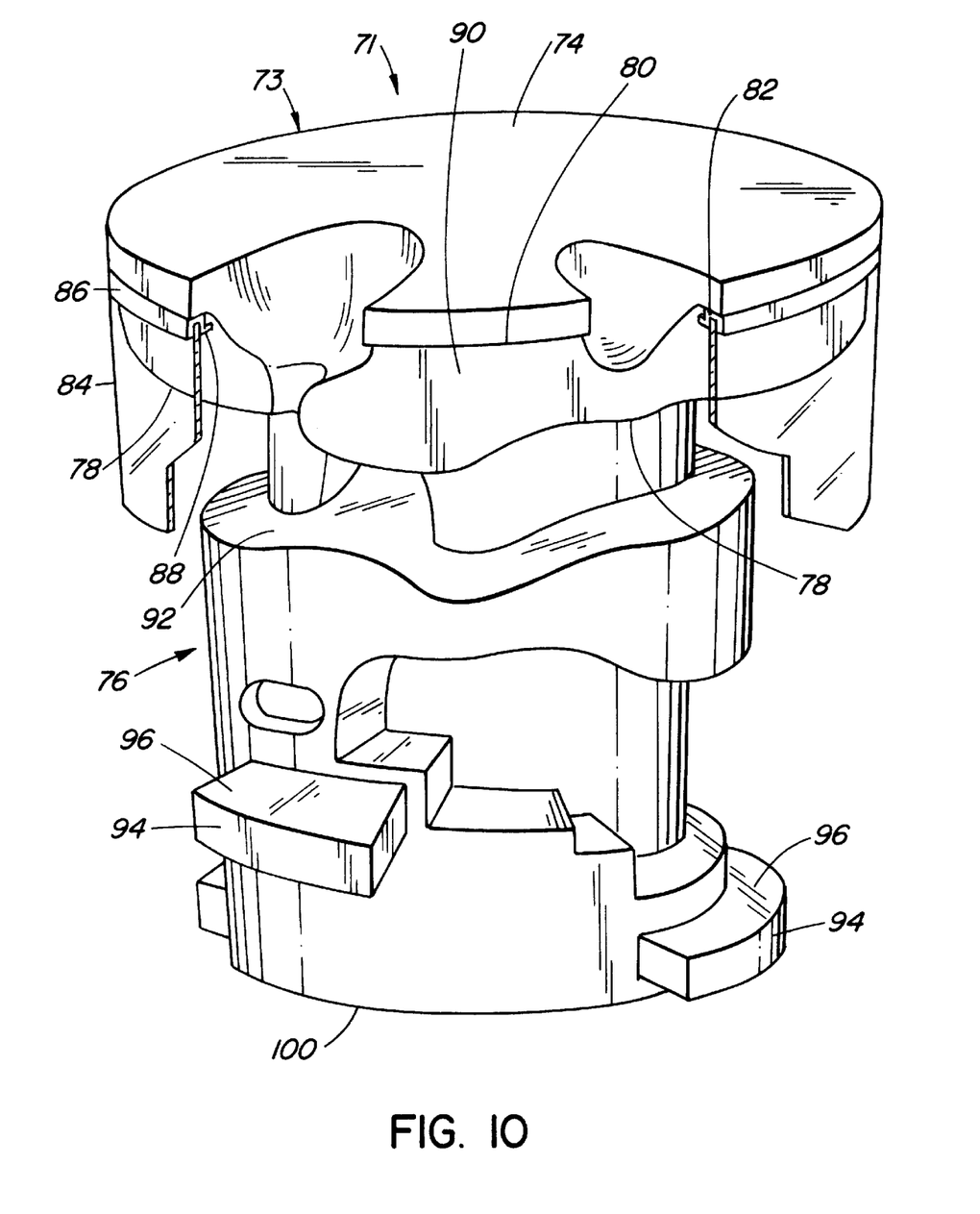
FIG. 10 is an isometric view of a pet animal structure according to a third embodiment and mounted within a cylindrical glass tank shown in chaindot.

The structure 70 is to be suspended within a cylindrical glass tank 84 by the support surface 82 carried upon a protective strip 86 having a lower inward flange 88 similar to flange 19 in the first embodiment. Between the shoulder 78 and the support surface 82 extends a vertical cylindrical surface 90 which extends alongside the inner surface at the top end region of the tank 84 and past the flange 88. In section, the structure assembled into the tank is similar to that of FIG. 8 with the shoulder 78 protecting the flange 88 from gnawing action of the animal.

The lower body part is formed with floor areas 92 and with outwardly projecting steps 94 having floor areas 96. The floor areas 96 are disposed lower than some of the floor areas 92 which, in turn, are disposed further in from the shoulder 78. The floors areas 92 and 96 are thus positioned similarly to the floor areas 28 and 29 to prevent a pet animal from reaching up to enable him to gnaw at the shoulder 78.

All of the lower body part 76 is located sufficiently inwards from the shoulder 78 to enable a pet animal freedom to move around the structure inside the tank without any narrow gaps to restrict movement and which instigate a gnawing action. It is also to be desired that the tank 84 is sufficiently deep to allow for complete freedom for animal movement below the undersurface 100.

The embodiments of the invention in which an exclusive right or privilege is claimed are defined as follows:

1. A pet animal structure for insertion into a transparent tank, the structure being in a single piece and comprising an upper body shoulder part and a lower body part, the lower body part to be inserted wholly within the tank and provided with floors for movement of the animal, and the upper body shoulder part to be inserted partly into the tank, the upper shoulder body part extending over floors of the lower body part and having:

a lower region providing a shoulder to be disposed within the tank and which overhangs the lower body part so as to face and extend towards upper wall regions of the tank and provide a barrier for an animal to top wall edges of the tank; and an upper region which overhangs the shoulder to define a substantially horizontally extending and downward facing support surface to be disposed above the tank for supporting the structure on the top wall edges of the tank with the lower body part suspended away from the bottom of the tank.

2. A pet animal structure according to claim 1 wherein the upper body shoulder part overhangs areas of the lower body part to a degree to ensure free passage of the animal between all these areas and a wall of the tank when the animal is on a floor of the tank.

3. A pet animal structure according to claim 1 wherein all of the floors of the lower body part are disposed in locations to prevent accessibility by the animal to gnaw the shoulder.

4. An animal structure according to claim 3 wherein the upper body shoulder part overhangs areas of the lower body part to a degree to ensure free passage of the animal between all these areas and a wall of the tank when the animal is on a floor of the tank.

5. A pet animal structure comprising an endless wall extending around and defining a cavity, the endless wall also defining a plurality of floors for movement of the animal and upwardly extending wall portions, the floors and wall portions having random shapes and configurations, the wall also defining an aperture for carrying an electric light bulb holder to hold an electric light bulb at a specific location within the cavity, and the wall permitting light to pass through the wall from the cavity with the randomly shaped and configurated floors and wall portions extending at random angles to the specific location for the light bulb so as to randomly alter the amount of light emitted through the wall from one wall position to other and adjacent wall positions.

* * * * *